(12) United States Patent
Olson et al.

(10) Patent No.: US 11,428,272 B2
(45) Date of Patent: Aug. 30, 2022

(54) SHAFT COUPLER

(71) Applicant: Bell Helicopter Textron Inc., Fort Worth, TX (US)

(72) Inventors: Eric Stephen Olson, Fort Worth, TX (US); Trenton Allen Hamm, Cleburne, TX (US); Bradford Jeffrey Ekstrom, Fort Worth, TX (US); Gregory Alan Spruce, Grand Prairie, TX (US)

(73) Assignee: Textron Innovations Inc., Providence, RI (US)

( * ) Notice: Subject to any disclaimer, the term of this patent is extended or adjusted under 35 U.S.C. 154(b) by 490 days.

(21) Appl. No.: 16/195,818

(22) Filed: Nov. 19, 2018

(65) Prior Publication Data

US 2020/0158181 A1 May 21, 2020

(51) Int. Cl.
*F16D 1/116* (2006.01)
*F16D 1/08* (2006.01)

(52) U.S. Cl.
CPC ............ *F16D 1/116* (2013.01); *F16D 1/0835* (2013.01); *Y10T 403/7033* (2015.01)

(58) Field of Classification Search
CPC ...... F16D 1/0805; F16D 1/0835; F16D 1/108; F16D 1/116; F16D 2001/062; F16D 2001/103; F16D 2003/22313; Y10T 403/5761; Y10T 403/5766; Y10T 403/5786; Y10T 403/581; Y10T 403/587; Y10T 403/7026; Y10T 403/7033; Y10T 403/7035; B64C 27/12; F16L 37/00; F16L 37/08; F16L 37/084; F16L 37/088; F16L 37/0885; F16L 37/0887; F16L 37/092; F16L 37/0925; F16L 37/0926; F16L 37/0927; A47L 9/242; A47L 9/244; A47L 9/248
USPC ........................................ 403/359.5; 15/246.2
See application file for complete search history.

(56) References Cited

U.S. PATENT DOCUMENTS

| | | | | |
|---|---|---|---|---|
| 4,639,163 | A | * | 1/1987 | Buthe ...................... F16D 1/116 403/322.2 |
| 5,141,264 | A | * | 8/1992 | Usui .................... F16L 37/0987 285/319 |
| 5,630,570 | A | * | 5/1997 | Lacroix ................... F16L 37/42 251/149.9 |

(Continued)

FOREIGN PATENT DOCUMENTS

| | | | | |
|---|---|---|---|---|
| DE | 102009020981 A1 | * | 11/2010 | ............. F16D 1/116 |
| FR | 2990253 A1 | * | 11/2013 | ............. F16D 1/108 |

*Primary Examiner* — Josh Skroupa
*Assistant Examiner* — Kevin J Baynes
(74) *Attorney, Agent, or Firm* — Pramudji Law Group PLLC; Ari Pramudji

(57) ABSTRACT

Briefly, implementations of claimed subject matter relate to methods and devices for coupling a first rotating shaft to a second shaft. In a particular implementation, an end of a plurality of resilient fingers of a resilient structure may be radially displaced to permit positioning of the resilient structure over a first shaft. An inwardly-directed portion of each of the plurality of the resilient fingers of the resilient structure may be secured to a channel located on an inner surface of a second shaft. After securing the resilient structure to the second shaft, the one or more resilient fingers of the resilient structure may be positioned within a slotted ladder ring encircling the first shaft.

20 Claims, 6 Drawing Sheets

(56) References Cited

U.S. PATENT DOCUMENTS

| | | | | |
|---|---|---|---|---|
| 5,807,180 | A * | 9/1998 | Knodle | F16D 1/0882 |
| | | | | 403/357 |
| 5,882,048 | A * | 3/1999 | Kawasaki | F16L 37/0885 |
| | | | | 285/319 |
| 7,811,052 | B2 * | 10/2010 | Guihard | F01D 5/026 |
| | | | | 415/122.1 |
| 8,025,454 | B2 * | 9/2011 | Cermak | F16D 1/116 |
| | | | | 403/319 |
| 9,494,041 | B2 * | 11/2016 | Fukutani | F01D 5/066 |
| 9,663,926 | B2 * | 5/2017 | Schurle | E03C 1/084 |
| 9,745,865 | B2 * | 8/2017 | Lefebvre | F01D 5/026 |
| 10,253,819 | B2 * | 4/2019 | Sherlock | F16B 21/18 |
| 10,302,140 | B2 * | 5/2019 | Vinski | F16D 1/0894 |
| 10,422,460 | B2 * | 9/2019 | Kujawski, Jr. | F16L 37/0885 |
| 10,514,071 | B2 * | 12/2019 | Piper | F16D 1/116 |
| 10,533,612 | B2 * | 1/2020 | Sugiyama | F16D 1/108 |
| 2008/0238087 | A1 * | 10/2008 | Wang | F16L 37/0985 |
| | | | | 285/39 |
| 2011/0309614 | A1 * | 12/2011 | Guest | F16L 37/0925 |
| | | | | 285/323 |
| 2012/0319401 | A1 * | 12/2012 | Wang | F16L 37/133 |
| | | | | 285/363 |
| 2017/0114935 | A1 * | 4/2017 | Kujawski, Jr | B25B 27/0028 |

* cited by examiner

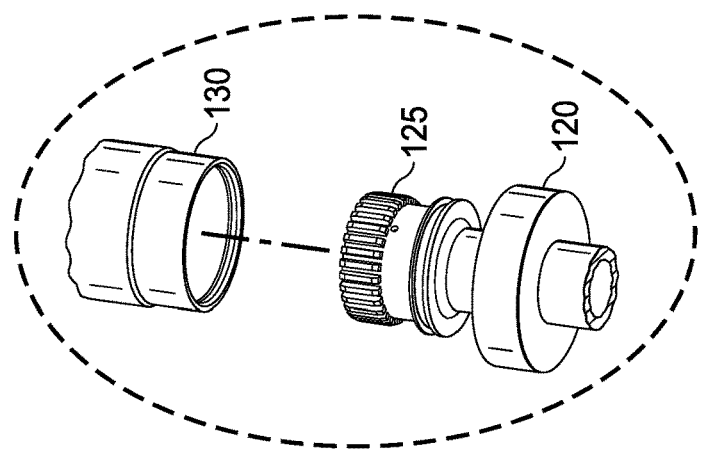
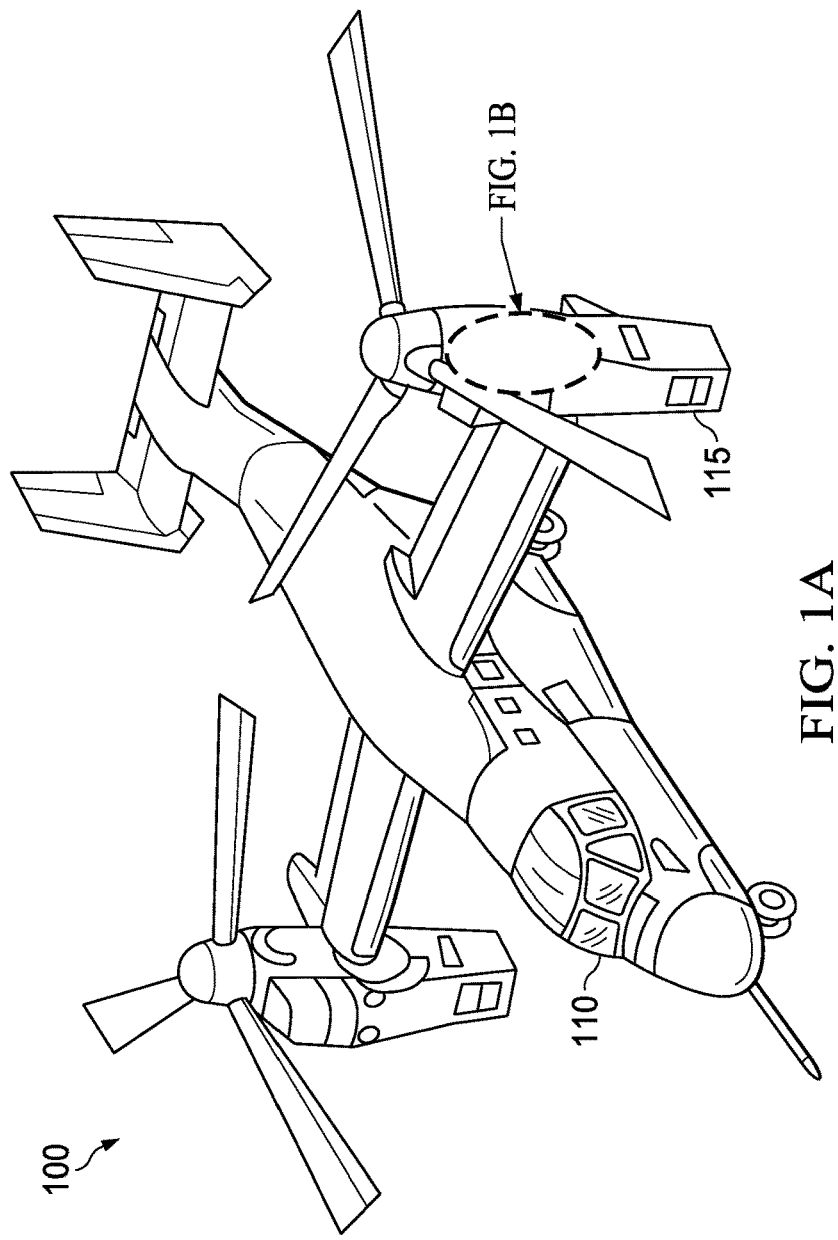
FIG. 1B
FIG. 1A

SHAFT COUPLER

STATEMENT REGARDING FEDERALLY SPONSORED RESEARCH OR DEVELOPMENT

Not applicable.

BACKGROUND

This section is intended to provide background information to facilitate an understanding of various technologies described herein. As the section's title implies, this is a discussion of related art. That such art may be related in no way implies that such art is prior art. It should therefore be understood that the statements in this section are to be read in this light and not as admissions of prior art.

In a number of instances, which may be encountered in automotive, aircraft, marine, and/or industrial applications, an engine or motor may be utilized to drive a rotating shaft. By driving such a shaft, torque produced by the engine or motor may be transmitted to one or more locations remote from the engine or motor, which may permit such transferred torque to provide useful work. Such useful work may thus be exploited, such as by rotating an automobile driveshaft, rotating one or more propellers of a fixed wing aircraft, rotating one or more rotors of a rotary wing aircraft, or enabling operation of many types of machines in industrial and/or factory environments. In applications such as these, some type of mechanical adapter may be utilized to transfer torque from an output port of an engine or motor to the shaft.

In addition to transferring torque from an engine or motor to a shaft, a mechanical adapter may also be required to restrict, or even to prohibit, relative motion between, for example, an output port of an engine and a shaft designed to transmit torque to a location remote from the engine. In some instances, failure to restrict relative motion between an output port of an engine and a shaft may bring about separation of a torque-transmitting shaft from an output port of an engine. Such separation between an output port of an engine or motor and a torque-transmitting shaft may bring about damage to the engine or motor as well as to equipment that relies on sufficient and relatively constant torque for proper operation. Hence, equipment and techniques for joining torque-producing engines or motors with torque-transmitting equipment continues to be an active area of investigation.

SUMMARY

Briefly, particular implementations of a shaft coupler, which may operate to join a first shaft with a second shaft, may comprise a ring base configured for fitting around the first shaft. The shaft coupler may further comprise a plurality of resilient fingers extending from the ring base in a direction at least substantially parallel to an axis of the ring base. The plurality of resilient fingers may be configured, such as at an end opposite the ring base, for displacement in a radial direction to permit positioning of the end opposite the ring base around the second shaft. The plurality of resilient fingers may be sized in length and width to allow deflection of the plurality of resilient fingers within an elastic range to avoid substantial permanent deformation during the positioning of the end opposite the ring base around the second shaft. The plurality of resilient fingers may comprise a decreased width at a location between the ring base and the end opposite the ring base relative to a width at the end opposite the ring base. The plurality of resilient fingers may be configured for insertion into corresponding slots of a ladder ring. The plurality of resilient fingers may additionally comprise a channel, which may be configured to accept a radial portion of a retaining ring.

In particular implementations, the plurality of resilient fingers may be configured for displacement, such as at an end opposite the ring base, by an amount of between about 2.0% and about 25.0% relative to the radius of the ring base. Such displacement may occur responsive to applying a force, such as to a resilient finger and in the radial direction, of between about 0.5 N and about 250.0 N. In an implementation, at least 3 resilient fingers may be utilized. The plurality of resilient fingers may each comprise an inwardly-directed portion, which may comprise a ridge to engage with a channel of an inner surface of the first shaft.

In particular implementations, a resilient structure of a shaft coupler may comprise a ring base, which may be configured for fitting around an outer surface of a first shaft. The resilient structure may additionally comprise a plurality of resilient fingers extending from the ring base and in a direction substantially parallel to the axis of the ring base, wherein the plurality of resilient fingers are configured for coupling around an outer surface of a second shaft. The resilient structure may utilize a ladder ring having arc-shaped slots configured to accept the plurality of resilient fingers of the structure. The resilient fingers of the structure may comprise a channel configured to engage with a radial portion of a retaining ring. Each of the plurality of resilient fingers may comprise a region having a reduced width relative to at least one other region.

In particular implementations, a method, such as a method of coupling a first shaft to a second shaft, may comprise displacing, in a radial direction, a portion of each of one or more resilient fingers at an end opposite the base ring, so as to position each of the resilient fingers over an outer surface of the first shaft. The method may additionally comprise engaging an inwardly-directed portion of each of the resilient fingers with a feature, such as a channel, located on an inner surface of a second shaft. The method may further comprise positioning the one or more resilient fingers of the resilient structure within a slotted ladder ring encircling the first shaft. In an implementation, positioning the one or more resilient fingers of a resilient structure may comprise positioning the at least 3 resilient fingers of the resilient structure within corresponding slots of the slotted ladder ring encircling the first shaft.

The method may additionally comprise inserting the first shaft into the second shaft. The method may additionally comprise engaging a radial portion of a retaining ring encircling the first shaft with a channel formed in the one or more resilient fingers of the structure. The method may further comprise displacing ends of the resilient fingers opposite a ring base of the coupler by applying a force of between about 0.5 N and about 250.0 N in a radial direction. In an implementation, applying such force may displace the one or more resilient fingers by an amount of between about 2.0% and about 25.0% of the radius of the resilient structure.

BRIEF DESCRIPTION OF THE DRAWINGS

The present technique(s) will be described further, by way of example, with reference to implementations thereof as illustrated in the accompanying drawings. It should be understood, however, that the accompanying drawings illustrate only the various implementations described herein and are not meant to limit the scope of various techniques, methods, systems, or apparatuses described herein.

FIGS. 1A-1B show a representative aircraft having a first shaft for coupling to a second shaft according to an implementation described herein;

Figure 2:
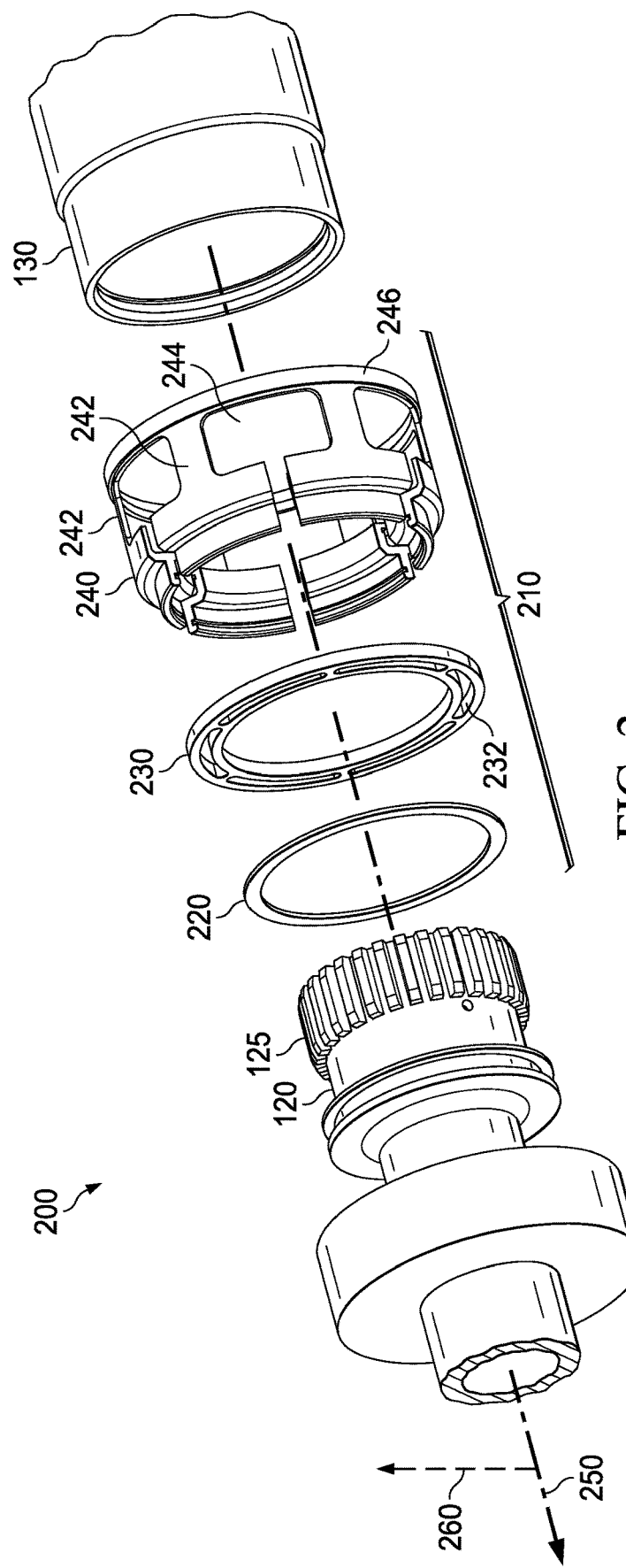
FIG. 2 is an illustration showing details of a shaft coupler for coupling a first shaft to a second shaft according to an implementation described herein.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

As previously mentioned, such as in instances involving automotive, aircraft, marine, and/or industrial applications, an engine or motor may be utilized to provide power to drive a rotating shaft. By driving such a shaft, torque generated by the engine or motor may be transmitted or conveyed to one or more locations remote from the engine or motor, which may permit the generated torque to provide useful work. Such useful work may be exploited according to conventional techniques, such as by driving an automobile driveshaft, rotating one or more propellers of a fixed wing aircraft, rotating one or more rotors of a rotary wing aircraft, or enabling operation of many types of machines in industrial or factory environments. In applications such as these, some type of coupler may be utilized to transfer torque from an output shaft of an engine or motor to a transmission shaft.

In particular implementations, to transfer torque from an engine output shaft to a transmission shaft, for example, an engine output shaft may utilize a number of splines, which may be designed to fit within one or more teeth of a gear cut into an inner surface of a hollow shaft that accepts the engine output shaft. In addition to permitting transfer of torque from an engine or motor to the shaft, it may be advantageous to restrict, or even to prohibit, relative motion between, for example, an output shaft of an engine and a torque-transmitting shaft designed to convey torque to a location remote from the engine. In some instances, failure to restrict relative motion between an output shaft of an engine and a shaft may bring about separation of a torque-transmitting shaft from an output shaft of an engine. Such separation between an output shaft of an engine or motor and a torque-transmitting shaft may bring about damage to the engine or motor as well as to equipment that relies on adequate and relatively constant torque for proper operation.

In particular implementations of claimed subject matter, a shaft coupler may be utilized to restrict relative motion, such as in an axial direction, which may give rise to separation of an output shaft of an engine and a torque-transmitting shaft. Accordingly, by securing an output shaft of an engine within a hollow torque-transmitting shaft, the engine output shaft and the torque-transmitting shaft may remain joined or coupled to each other under a variety of circumstances. Thus, for example, in a rotary-wing aircraft environment, such as may be encountered when one or more engines are coupled to a transmission, for example, torque-transmitting components may remain reliably engaged with one another under a variety of load conditions and/or flight envelopes. Such secure coupling of torque-transmitting components may bring about increased aircraft performance, increased crew safety, and enhanced mission readiness, for example.

Particular implementations of claimed subject matter will now be described with reference to the figures, such as FIGS. 1A-1B, which show a representative aircraft 100 having a first shaft for coupling to a second shaft according to various implementations described herein. Although representative aircraft 100 shows a tiltrotor aircraft, wherein planes of counterrotating rotors may be rotated forward so as to permit the aircraft to move in a forward direction, implementations of claimed subject matter are not limited to applications of such aircraft. Rather, claimed subject matter is intended to embrace a variety of aircraft environments, automotive environments, marine environments, and/or industrial applications, which may utilize a torque-producing engine having an output shaft and a torque-transmitting shaft.

In FIG. 1A, engine nacelle 115 may house a turbine engine, for example, which may operate to provide torque to drive one or more rotors of representative aircraft 100. Thus, in at least one nonlimiting implementation, an engine output shaft, such as engine output shaft 120, may benefit from utilization of a shaft coupler, which may permit coupling of engine output torque to transmission shaft 130. As shown FIG. 1B, engine output shaft 120 may comprise splines 125, which may be engageably secured with one or more teeth of at least one gear formed in an inner surface of transmission shaft 130. It should be noted that in other implementations, output shaft 120 and/or transmission shaft 130 may utilize other approaches towards transmitting torque from an output shaft to a transmission shaft, and claimed subject matter is not limited in this respect.

FIG. 2 is an illustration showing details of a shaft coupler for coupling a first shaft to a second shaft according to implementation 200 described herein. In FIG. 2, engine output shaft 120 comprises splines 125, which may be suited for engageably securing within a gap between the one or more teeth of a gear (not shown in FIG. 2) formed in an inner surface of transmission shaft 130. As engine output shaft 120 rotates about a central axis, transmission shaft 130 may rotate in concert with engine output shaft 120. In implementation 200, shaft coupler 210, which may comprise resilient structure 240, ladder ring 230, and/or retaining ring 220, for example, may ensure that engine output shaft 120 remains reliably secured within transmission shaft 130.

In an implementation, as described further herein, especially in the description pertaining to FIG. 6A-6F, engine output shaft 120 may be coupled to transmission shaft 130 by first sliding retaining ring 220 and ladder ring 230 over one or more features of engine output shaft 120. In implementation 200, engine output shaft 120 may include features other than splines 125, and claimed subject matter is not limited in this respect. After sliding retaining ring 220 and ladder ring 230 over features of engine output shaft 120, resilient fingers 242 of resilient structure 240 may be extended or displaced in a radial direction, such as in a direction indicated by radially-directed line 260 of FIG. 2, so as to permit features of engine output shaft 120 to pass beneath resilient fingers 242. Transmission shaft 130 may be subsequently moved into position beneath ring base 246 to permit engagement of a channel located at an inner surface of transmission shaft 130 with a ridge, for example, formed on resilient structure 240. Responsive to engagement of transmission shaft 130 with resilient structure 240, arc-shaped slots 232 of ladder ring 230 may be adjusted to align with portions of resilient fingers 242 so that ladder ring 230 may be slid into contact with resilient fingers 242.

Figure 3:
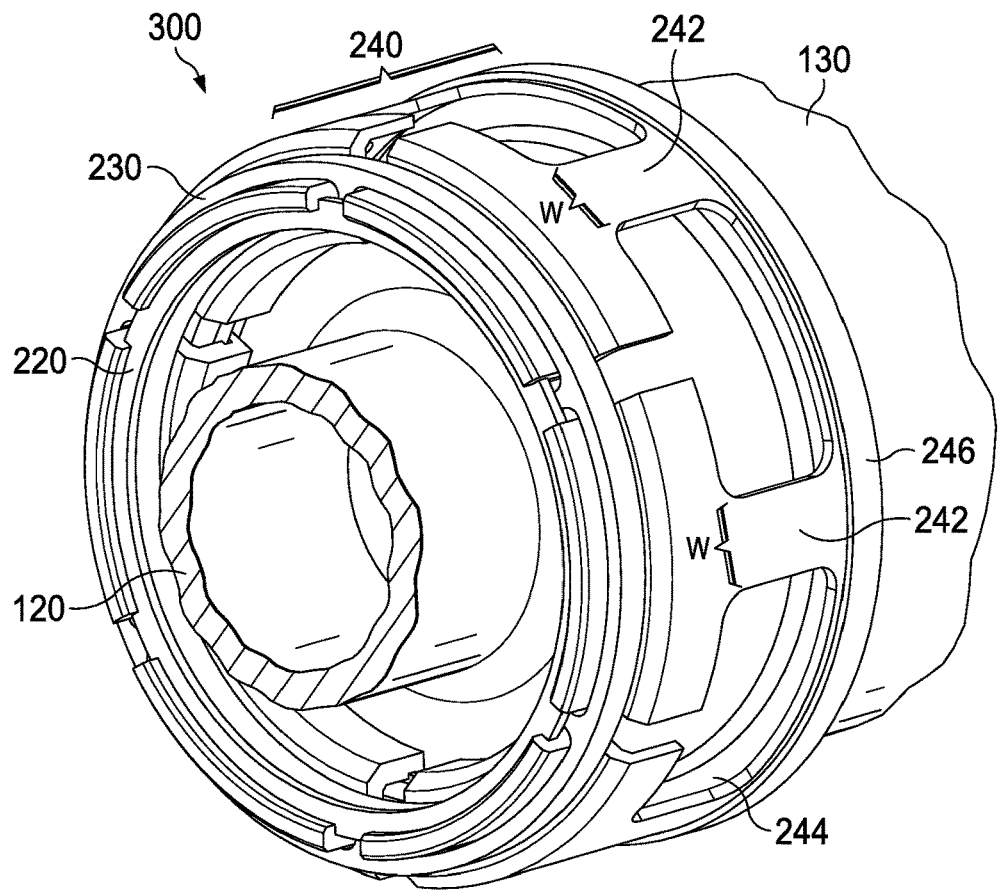
FIG. 3 is an illustration showing a shaft coupler utilized to couple a first shaft to a second shaft according to an implementation described herein.

FIG. 3 is an illustration showing a shaft coupler utilized to couple a first shaft to a second shaft according to an implementation 300 described herein. As shown in FIG. 3, ring base 246 of resilient structure 240 is positioned to encircle transmission shaft 130, while resilient fingers 242 are positioned to encircle features of output shaft 120. Arc-shaped slots 232 of ladder ring 230 are aligned with resilient fingers 242 to permit the ladder ring to fit into place, thereby retaining ladder ring 230 in contact with resilient structure 240. An outer (or radial) portion of retaining ring 220 is shown in contact with ladder ring 230, so as to permit ladder ring 230 to remain in place. However, it should be noted that in particular implementations, resilient structure 240 may be utilized to couple a first shaft to a second shaft without employing ladder ring 230 and retaining ring 220. In such implementations, fitting resilient structure 240 around end portions of a first and second shaft may provide secure coupling between output shaft 120 and transmission shaft 130.

In implementation 300, cutouts 244 are shown as separating adjacent resilient fingers 242. In addition, resilient fingers 242 are shown as originating from ring base 246 and traversing in a direction at least substantially parallel to axially-directed line 250. As resilient fingers 242 traverse from ring base 246, the resilient fingers are shown as comprising a width "W" near a middle portion of each finger before increasing in width at end opposite ring base 246. In implementations, width "W" of resilient fingers 242, in addition to other parameters (e.g., material, thickness, etc.) may be selected to permit displacement in a radial direction, such as at least substantially parallel to radially-directed line 260. Thus, it may be appreciated (as discussed with respect to FIGS. 6A-6F) that when resilient fingers 242 transition to a smaller width "W," displacement in a radial direction may require a relatively small force. It may also be appreciated that if resilient fingers 242 were to transition to a larger width "$W_L$," wherein $W_L$>W, displacement in a radial direction (e.g., parallel to line 260) may require greater force.

In particular implementations, width "W" may be selected so as to permit each end of resilient fingers 242, opposite ring base 246, to allow displacement in a radial direction of between about 2.0% and about 25.0%, relative to the radius of ring base 246, responsive to applying a force in the radial direction of between about 0.5 N and about 250.0 N. However, although resilient fingers 242 are shown as transitioning to a smaller width "W," particular implementations of a resilient structure may comprise resilient fingers that maintain a substantially constant width along a length dimension of the resilient fingers (e.g., parallel to axially-directed line 250). In particular implementations, resilient fingers may be sized in length and width to allow deflection of the resilient fingers within an elastic range so as to avoid substantial permanent deformation during the positioning of an end opposite the ring base around a shaft.

It may be appreciated that in particular implementations, resilient fingers may be displaced in a radial direction of between about 2.0% and about 25.0% relative to the radius of ring base 246 via a manual process involving an individual hand-tightening fingers of the resilient structure. In such instances, hand-tightening and/or hand-installation of a resilient structure may involve application of relatively small forces, such a force of between 0.5 N and 25.0 N, 0.5 N and 50.0, or a force up to as high as 100.0 N, for example. However, in other implementations, installation of a resilient structure may involve use of one or more power assisted tools so as to generate larger forces, such as forces of between 50.0 N and 100.0 N, for example, or forces of between 100.0 N and 250.0 N. Claimed subject matter is intended to embrace installation of a resilient structure, such as resilient structure 240, via application of any useful force, or range of forces, virtually without limitation.

In certain implementations, resilient structure 240 may comprise stainless steel, for example, which may perhaps be suitable for high-stress environments, such as environments exposed to excessive heat, rain, dust and/or sand, and so forth. However, claimed subject matter is intended to embrace resilient structures, ladder rings, and/or retaining rings comprising a variety of material types, virtually without limitation.

As shown in FIG. 3, resilient structure 240 comprises 6 resilient fingers 242. However, in alternative implementations, a larger number of resilient fingers 242, such as seven resilient fingers, eight resilient fingers, nine resilient fingers, or perhaps as many as fifteen, twenty, or twenty-five resilient fingers, for example, may be utilized. Additionally, in other implementations, a smaller number of resilient fingers 242, such as three resilient fingers, four resilient fingers, or five resilient fingers, for example, may be utilized, and claimed subject matter is intended to embrace any useful number of resilient fingers depending, for example, on material selection, dimensions of resilient structure 240, operating environment shaft 120 and/or shaft 130, features present on one or more of shaft 120 and/or shaft 130, and so forth.

Figure 4:
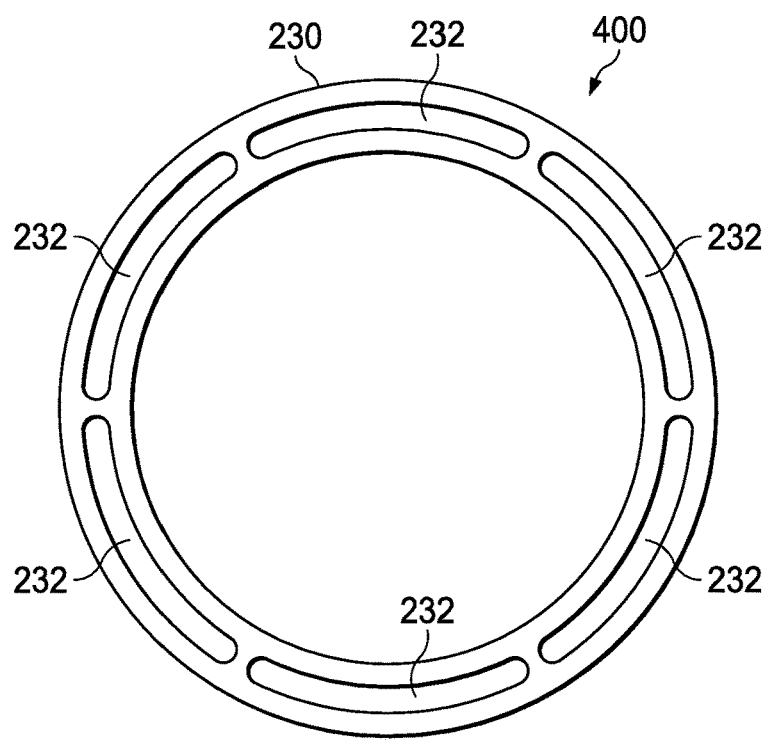
FIG. 4 is an illustration of a ladder ring utilized in a shaft coupler for coupling a first shaft to a second shaft according to an implementation described herein.

FIG. 4 is an illustration of a ladder ring utilized in a shaft coupler for coupling a first shaft to a second shaft according to an implementation 400 described herein. As discussed in relation to FIG. 3, although ladder ring 230, comprises six arc-shaped slots 232, which may correspond to six resilient fingers of resilient structure 240, claimed subject matter is intended to embrace any number of slots and corresponding resilient fingers of a resilient structure. Additionally, although ladder ring 230 comprises six uniformly-sized arc-shaped slots 232, other implementations may comprise nonuniformly-sized slots, which may fit over correspondingly sized fingers of resilient structure 240. In one implementation, use of nonuniformly sized slots may permit a resilient structure to be keyed so as to permit a ladder ring to engage with the resilient structure responsive to the ladder ring being positioned at a particular angular orientation with respect the structure.

Figure 5:
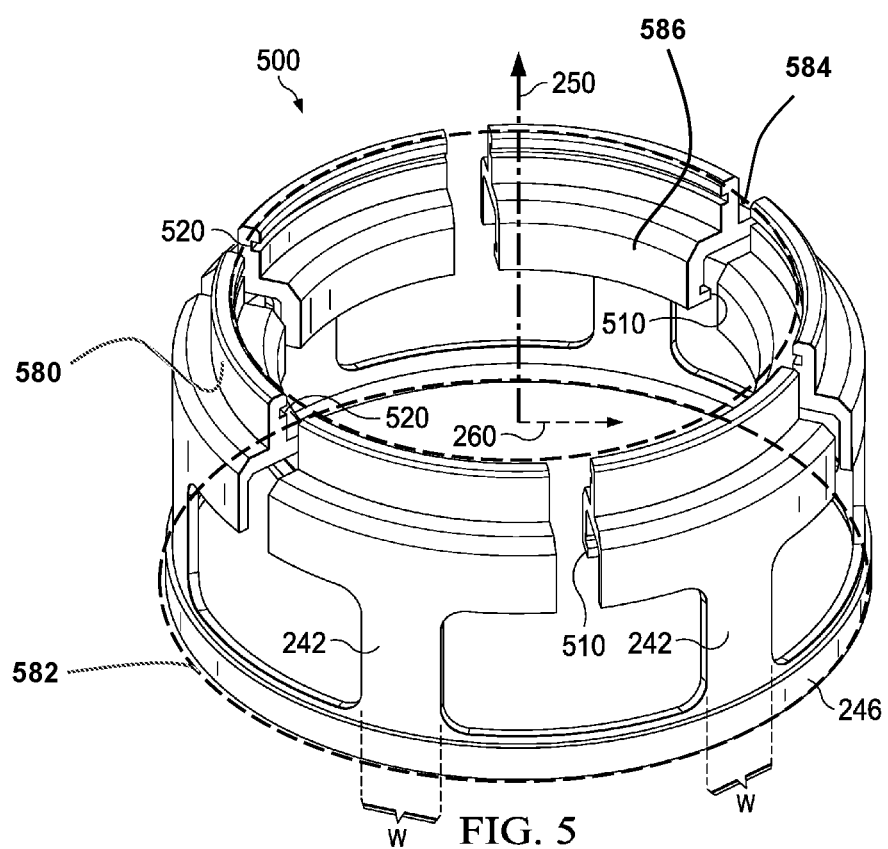
FIG. 5 is an illustration of a structure that forms a part of a shaft coupler to couple a first shaft to a second shaft according to an implementation described herein.

FIG. 5 is an illustration of a resilient structure that forms a part of a shaft coupler to couple a first shaft to a second shaft according to an implementation 500 described herein. As shown in FIG. 5, resilient fingers 242 ascend from ring base 246 to comprise a width "W" near a middle section of each of resilient fingers 242 before each finger increases in width at an end opposite the ring base 246. Additionally, each of resilient fingers 242 may bifurcate to comprise an inwardly-directed portion terminating in a direction opposite that of axially-directed line 250, and toward ring base 246. An inwardly-directed portion 586 of each of resilient fingers 242 may comprise a ridge, such as ridge 510, which may permit engagement of each finger with a portion of an inner surface of a torque-transmitting shaft. A second bifurcated portion may extend in an axial direction, such as substantially parallel with axially-directed line 250, and may comprise a channel, such as channel 520, formed to receive a radial portion of a retaining ring, such as retaining ring 220 of FIG. 2.

With further reference to FIG. 5, the resilient structure 240 may include an arcuate tab 580. The arcuate tab 580 may be at a distal end of the resilient structure relative to the ring base 246. The arcuate tab 580 may be curved such that a center of curvature is the axially directed line 250. The ring base 246 may form a first circle 582 about the axially directed line and each arcuate tab 580 may form a second circle 584 about the axially directed line 250. The first circle 582 may have a greater diameter than the second circle 584.

The resilient structure 240 may further include an inwardly directed portion 586. The inwardly directed portion 586 may extend from an interior surface of the resilient structure and may be located proximal to the ring base 246 relative to the arcuate tab 580. For example, the arcuate tab 580 may extend from the inwardly directed portion 586 in a direction away from the ring base 246.

Figure 6A:
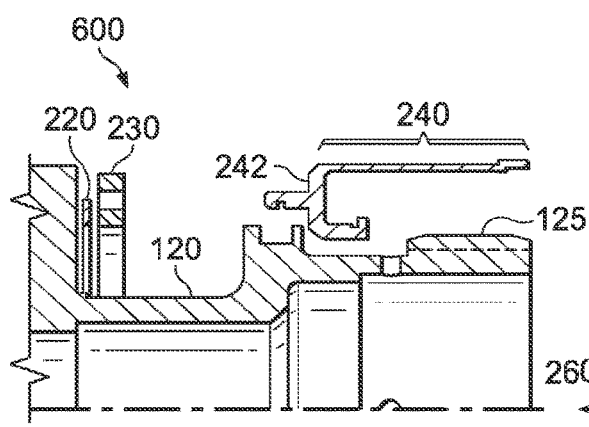
FIGS. 6A-6F show illustrations to depict subprocesses for coupling a first shaft to a second shaft according to an implementation described herein.

FIGS. 6A-6F show illustrations to depict subprocesses for coupling a first shaft to a second shaft according to an implementation described herein. It should be noted that in other implementations, only a subset of the subprocesses of FIGS. 6A-6F may be performed, while in still other implementations, additional subprocesses beyond those identified in FIGS. 6A-6F may be performed. Further, in other implementations, subprocesses of FIGS. 6A-6F may be performed in an order different than indicated, and claimed subject matter is not limited in this respect. In FIG. 6A (diagram 600), retaining ring 220 and ladder ring 230 may be positioned around a first shaft, such as engine output shaft 120. After positioning retaining ring and ladder ring 230 around shaft 120, a resilient structure, such as resilient structure 240, may be placed around at least a portion of shaft 120. In the implementation of FIG. 6A, resilient structure 240 may be positioned over splines 125, for example, without requiring any type of displacement or other type of manipulation of one or more resilient fingers of structure 240.

Figure 6B:
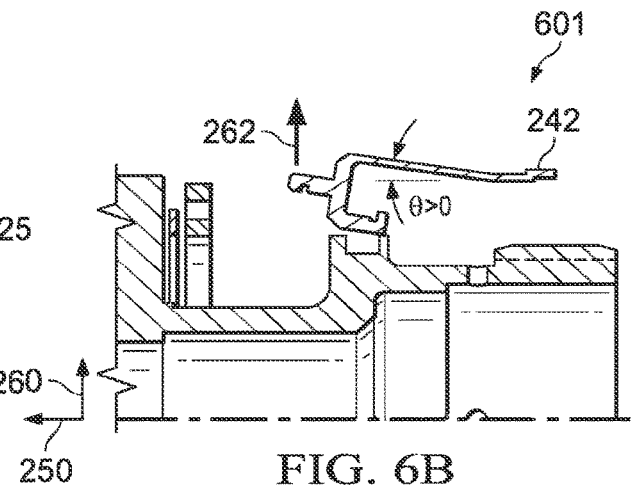

In FIG. 6B (diagram 601), at least a portion of each of resilient fingers 242 of resilient structure 240 may be displaced in a radial direction, such as in a direction at least substantially parallel to line 260 (e.g., as indicated by line 262). In an implementation, displacement of an end portion of each of resilient fingers 242, such as at an end portion opposite ring base 246, may permit each of resilient fingers 242 to avoid contact, or make only nominal contact, with one or more features of shaft 120. In one implementation, fitting of resilient structure 240 over shaft 120 may involve deflecting one or more of resilient fingers 242 in a direction substantially parallel to line 260, which may form an angle θ>0.0, as shown in FIG. 6B. In particular implementations, deflection of one or more resilient fingers 242 to avoid contact (or to make only nominal contact) with features of shaft 120 may involve deflection of resilient fingers 242 to form an angle θ relative to a direction at least substantially parallel to axially-directed line 250 of between about 5.0° and about 25.0°, for example, although claimed subject matter is not limited in this respect. In certain implementations, deflection of resilient fingers 242 to form an angle θ of between 5.0° and 25.0° may involve application of a force between approximately 0.5 N and 250.0 N, although claimed subject matter is not so limited.

Figure 6C:
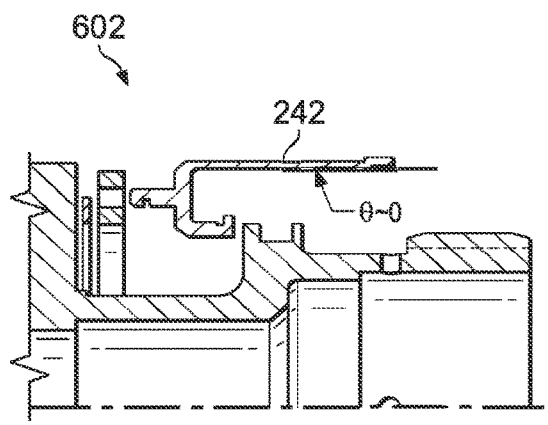
Figure 6D:
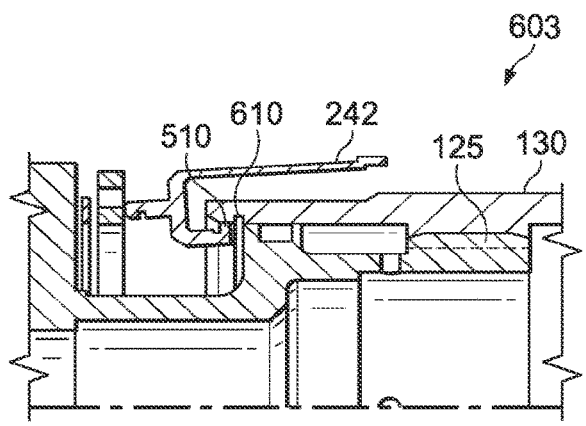
Figure 6E:
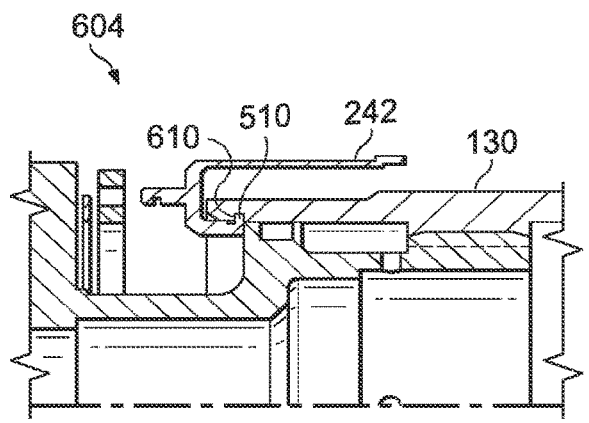

In FIG. 6C (diagram 602), one or more of resilient fingers 242 may be returned to a non-deflected position, such as a position wherein angle θ comprises approximately 0.0°. Responsive to returning one or more of resilient fingers 242 to a non-deflected position, a second shaft, such as shaft 130, may be inserted between resilient structure 240 and shaft 130. As shown in FIG. 6D (diagram 603) insertion of second shaft 130 between resilient structure 240 and shaft 120 may involve positioning ridge 510 of resilient structure 240 so as to be capable of being positioned within channel 610 formed in an inner surface of shaft 130. As shown in FIG. 6E (diagram 604) ridge 510 of resilient structure 240 may be engageably secured within channel 610 of shaft 130.

Figure 6F:
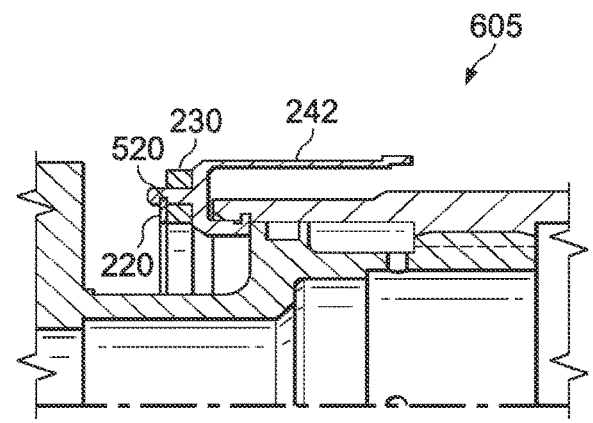

In FIG. 6F (diagram 605), ladder ring 230 may be placed into contact with resilient structure 240. In diagram 605, placing ladder ring 230 into contact with resilient structure 240 may involve rotating the ladder ring so as to align slots (such as arc-shaped slots 232 shown in FIG. 2) with resilient fingers 242. After resilient fingers 242 are engaged by arc-shaped slots 232, a radial portion of retaining ring 220 may be placed into contact with a channel, such as channel 520 formed within a portion of resilient finger 242.

Figure 7:
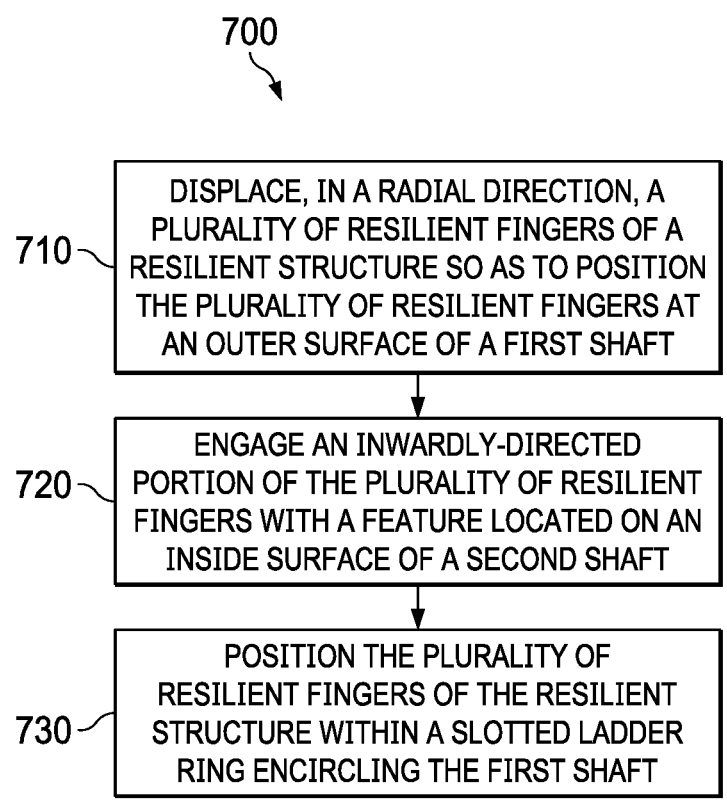
FIG. 7 is a flow chart for a method of coupling a first shaft to a second shaft according to an implementation described herein.

FIG. 7 is a flow chart for a method 700 of coupling a first shaft to a second shaft according to an implementation described herein. FIG. 7 may include blocks in addition to those shown and described, fewer blocks or blocks occurring in an order different than may be identified, or any combination thereof. Method 700 may begin at block 710, which may include displacing, such as in a direction indicated by radially-directed line 260 of FIG. 2, one or more resilient fingers of a structure so as to position the one or more resilient fingers at an outer surface of a first shaft. Accordingly, block 710 may comprise displacing at least 3 resilient fingers extending in an axial direction from a ring base of a resilient structure, such as resilient structure 240. In particular implementations, such displacing of the plurality of resilient fingers of the resilient structure may permit the plurality of resilient fingers to be positioned over an outer surface of a first shaft by way of applying radially-directed force of between about 0.5 N and about 250.0 N to at least some of the plurality of resilient fingers. In particular implementations, application of such a force may bring about deflection of one or more of the plurality of resilient fingers so as to form an angle of between about 5.0° and about 25.0° with respect to a line substantially parallel with axially-directed line 250 shown in FIG. 2. In implementations, applying radially-directed force may involve displacing an end (opposite the ring base of a resilient structure) by an amount of between about 2.0% and about 25.0% relative to the radius of the ring base.

Method 700 may continue at block 720, which may comprise engaging an inwardly-directed portion of the one or more resilient fingers with a feature located on an inner surface of the second shaft. In an implementation, block 720 may comprise engaging a ridge, such as ridge 510 depicted in FIG. 6D, with channel 610 of shaft 130, also as depicted in FIG. 6D. Method 700 may continue at block 730, which may comprise positioning one or more resilient fingers of the coupler within arc-shaped slots of ladder ring, such as a ladder ring 230 of FIG. 2. Block 730 may additionally comprise positioning at least a radial (e.g., an outer) portion of a retaining ring, such as retaining ring 220 of FIG. 2, within a channel or other feature located on each of the plurality of resilient fingers at an end opposite the ring base of the resilient structure.

Although illustrative implementations of claimed subject matter have been described in detail herein with reference to the accompanying drawings, it is to be understood that the invention is not limited to those precise implementations, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

What is claimed is:

1. A resilient structure, comprising:
    a ring base configured for fitting around a first shaft; and
    a plurality of resilient fingers extending from the ring base in a direction at least substantially parallel to an axis of the ring base, wherein the plurality of resilient fingers are configured, at an end opposite the ring base, for displacement in a radial direction to permit positioning of the end opposite the ring base around a second shaft, and
    wherein the plurality of the resilient fingers forms a first circle around the axis of the ring base, the first circle has a first outer surface diameter, and each of the plurality of resilient fingers has an arcuate tab extending away from the ring base in an axial direction directly from and perpendicularly to an inwardly-directed portion, and
    wherein the arcuate tabs form a second circle around the axis of the ring base, the second circle having a second outer surface diameter, the first outer surface diameter being larger than the second outer surface diameter.

2. The resilient structure of claim 1, wherein the plurality of resilient fingers comprise a decreased width, at a location between the ring base and the end opposite the ring base, relative to a width at the end opposite the ring base.

3. The resilient structure of claim 1, wherein the plurality of resilient fingers are sized in length and width to allow deflection of the plurality of resilient fingers within an elastic range to avoid substantial permanent deformation during the positioning of the end opposite the ring base around the second shaft.

4. The resilient structure of claim 1, wherein the plurality of resilient fingers are configured for insertion into corresponding slots of a ladder ring.

5. The resilient structure of claim 1, wherein the plurality of resilient fingers comprise a channel configured to accept a radial portion of a retaining ring.

6. The resilient structure of claim 1, wherein the displacement comprises displacement in the radial direction of between about 2.0% and about 25.0%, relative to the radius of the ring base, responsive to applying force in the radial direction of between about 0.5 N and about 250.0 N.

7. The resilient structure of claim 1, wherein the plurality of resilient fingers comprises at least 3 resilient fingers.

8. The resilient structure of claim 1, wherein the plurality of resilient fingers comprise the inwardly-directed portion, the inwardly-directed portion comprising a ridge for engaging with a channel of an inner surface of the first shaft.

9. A shaft coupler, comprising:
    a ring base configured for fitting around an outer surface of a first shaft;
    a plurality of resilient fingers extending from the ring base in a direction substantially parallel to an axis of the ring base, wherein the plurality of resilient fingers are configured for displacement to permit positioning around an outer surface of a second shaft;
    a ladder ring having arc-shaped slots configured to accept the plurality of resilient fingers; and
    a retaining ring configured to engage with one or more features of the plurality of resilient fingers, and
    wherein the plurality of the resilient fingers forms a first circle around the axis of the ring base, the first circle, has a first outer surface diameter, and each of the plurality of resilient fingers has an arcuate tab extending in an axial direction from an inwardly-directed portion, and
    wherein the arcuate tabs form a second circle around the axis of the ring base, the second circle having a second outer surface diameter, the first outer surface diameter being larger than the second outer surface diameter.

10. The shaft coupler of claim 9, wherein the plurality of resilient fingers comprises at least 3 resilient fingers.

11. The shaft coupler of claim 9, wherein the plurality of resilient fingers comprises a region having a reduced width relative to at least one other region of each of the plurality of resilient fingers.

12. The shaft coupler of claim 11, wherein each finger of the plurality of resilient fingers is configured to permit displacement in a radial direction of between about 2.0% and about 10.0% responsive to applying force in the radial direction of between about 0.5 N and about 250.0 N.

13. The shaft coupler of claim 9, wherein each finger of the plurality of resilient fingers includes the inwardly-directed portion that curls in a direction towards the ring base at an end opposite the ring base.

14. The shaft coupler of claim 13, wherein the inwardly-directed portion of each of the plurality of resilient fingers comprises a feature to permit engagement of each finger with a corresponding portion of an inner surface of the first shaft.

15. A method, comprising:
    displacing, in a radial direction, a plurality of fingers of a resilient structure so as to permit positioning of the plurality of resilient fingers at an outer surface of a first shaft;
    engaging an inwardly-directed portion of the plurality of resilient fingers with a feature located on an inner surface of a second shaft; and
    positioning the plurality of fingers of the resilient structure within a slotted ladder ring encircling the first shaft.

16. The method of claim 15, additionally comprising inserting the first shaft into the second shaft.

17. The method of claim 15, further comprising: engaging a retaining ring encircling the first shaft with a channel formed at the plurality of fingers of the resilient structure.

18. The method of claim 15, wherein displacing the plurality of fingers of the resilient structure so as to position the plurality of resilient fingers at the outer surface of the first shaft comprises applying a radially-directed force to at least some of the plurality of resilient fingers of between about 0.5 N and about 250.0 N.

19. The method of claim 18, wherein displacing the plurality of fingers of the resilient structure comprises displacing the plurality of resilient fingers by an amount of between about 2.0% and about 25.0% of the radius of the resilient structure.

20. The method of claim 15, wherein positioning the plurality of resilient fingers comprises positioning at least 3 resilient fingers of the resilient structure within corresponding slots of the slotted ladder ring encircling the first shaft.

* * * * *